UNITED STATES PATENT OFFICE.

PAUL HÜSSY AND MAX HARTMANN, OF BASEL, SWITZERLAND, ASSIGNORS TO SOCIETY OF CHEMICAL INDUSTRY IN BASLE, OF BASEL, SWITZERLAND.

MERCURY COMPOUNDS OF THE ACRIDIN SERIES AND PROCESS OF MAKING SAME.

1,259,517.   Specification of Letters Patent.   Patented Mar. 19, 1918.

No Drawing.   Application filed November 28, 1917. Serial No. 204,366.

*To all whom it may concern:*

Be it known that we, PAUL HÜSSY, physician, and MAX HARTMANN, chemist, both citizens of the Swiss Republic, and residents of Basel, Switzerland, have invented new and useful Mercury Compounds of the Acridin Series and Processes of Making Same, of which the following is a full, clear, and exact specification.

We have found that therapeutically valuable compounds of the acridin series are obtained by acting with a soluble mercury salt on corresponding quantities of the bases or salts of acridin dyestuffs, which may be alkylated at the acridin nitrogen, in the presence of convenient solvents, as for instance water or alcohol. The thus obtained well defined crystalline compounds possess a marked bactericide action and can be employed for many therapeutical purposes.

For the preparation of the new compounds there can be added, for instance, to a solution as concentrated as possible of the desired acridin dyestuff salt in a convenient solvent, as, for instance, water or alcohol, a likewise concentrated solution of a mercury salt soluble in the solvent employed; whereupon the crystallization of the new mercury compound formed begins mostly after a short time and can be completed by cooling or, if desired, by adding a convenient precipitant, as, for instance, ether. The separation of the new compounds is effected in the usual manner by filtering, washing and drying.

The new mercury compounds constitute yellow-brown powders, which dissolve in water to yellow-green solutions, in alcohol, acetic ether, glacial acetic acid and acetone to solutions showing after dilution yellow-green fluorescences and in concentrated sulfuric acid with an intense green fluorescence. Even when greatly diluted, their solutions still strongly act on bacteria to check the growth thereof.

The process is illustrated by the following examples:

Example 1: 4 parts of the acridin dyestuff methylated at the acridin nitrogen, obtained in the known manner by heating 2:7-dimethyl-3:6-diamino-acridin with methylchlorid under pressure, are dissolved in dilute hydrochloric acid and to the solution obtained is added a solution of 4 parts of mercury chlorid in hot water. The new mercury compound separates immediately. After cooling it is separated by filtration, washed with a little water, alcohol and ether and dried. It constitutes a yellow-brown powder soluble in water with yellow-green coloration.

Example 2: 210 parts of 3:6-diamino-acridin are dissolved in 400 parts of alcohol, while boiling, and to the solution thus obtained is added a solution of 200 parts of mercury acetate in 400 parts of alcohol. The mixture is heated for 2 hours on a water bath and the new mercury compound formed is separated by filtration. It constitutes a yellow-brown powder, difficultly soluble in cold water and the most of the organic solvents, but soluble in hot water with a yellow-green fluorescence.

Instead of those indicated in the examples, other acridin dyestuffs can be transformed into mercury compounds showing analogous properties. For the mercury salts indicated in the examples other convenient soluble mercury salts can be employed. Also the other conditions may be varied within wide limits.

What we claim is:

1. The herein described process for the manufacture of therapeutically valuable mercury compounds of the acridin series, consisting in acting on an acridin dyestuff with a soluble mercury salt in presence of a solvent.

2. The herein described process for the manufacture of therapeutically valuable mercury compounds of the acridin series, consisting in acting on an acridin dyestuff alkylated at the acridin nitrogen with a soluble mercury salt in presence of a solvent.

3. As new products, the herein described therapeutically valuable mercury compounds of the acridin series constituting yellow-brown powders, which dissolve in water with yellow-green colorations, in alcohol, acetic ether, glacial acetic acid and acetone to solutions showing, when greatly diluted, a yellow-green fluorescence and in concentrated sulfuric acid with an intense green fluorescence, and their solutions acting, even when greatly diluted, strongly on bacteria to check the growth thereof.

4. As a new article of manufacture, the herein described therapeutically valuable mercury compound of the acridin dyestuffs methylated at the acridin nitrogen, obtained by heating 2:7-dimethyl-3:6-diamino-acridin with methylchlorid under pressure, which constitutes a yellow-brown powder dissolving in water with a yellow-green coloration, in alcohol, acetic ether, glacial acetic acid and acetone with a yellow-green fluorescence and in concentrated sulfuric acid with a yellow-brown coloration.

In witness whereof we have hereunto signed our names this 10th day of November 1917, in the presence of two subscribing witnesses.

PAUL HÜSSY.
MAX HARTMANN.

Witnesses:
H. H. DICK,
OLMOND RUTTER.